United States Patent [19]
Hashimoto

[11] Patent Number: 5,847,716
[45] Date of Patent: Dec. 8, 1998

[54] MANIPULATION OF GRAPHIC STRUCTURES USING INVERSE KINEMATICS

[75] Inventor: Roy Hashimoto, Redwood City, Calif.

[73] Assignee: Silicon Graphics, Inc., Mountain View, Calif.

[21] Appl. No.: 690,112

[22] Filed: Jul. 31, 1996

[51] Int. Cl.[6] ................................................ G06T 15/70
[52] U.S. Cl. ......................................................... 345/473
[58] Field of Search .................................. 345/473, 474, 345/418, 419, 420, 421

[56] References Cited

U.S. PATENT DOCUMENTS

| | | | |
|---|---|---|---|
| 5,623,428 | 4/1997 | Kunii et al. | 345/473 |
| 5,680,532 | 10/1997 | Amakawa et al. | 345/473 |
| 5,684,943 | 11/1997 | Abraham et al. | 345/473 |
| 5,766,016 | 6/1998 | Sinclair et al. | 345/473 |

OTHER PUBLICATIONS

Foley, James D., et al., *Computer Graphics: Principles and Practice,* (Second Edition in C), pp. 213–226.
Press, William H., *Numerical Recipes in C: The Art of Scientific Computing,* (Second Edition) (1995), Chapter 10, pp. 394–455.

*Primary Examiner*—Cliff N. Vo
*Attorney, Agent, or Firm*—Fish & Richardson P.C.

[57] ABSTRACT

A graphic structure having joint angles is manipulated from an initial configuration towards a goal configuration by a succession of iterations, in each of which an update configuration is derived from a prior configuration. A regular iteration determines at least one test configuration by modifying fewer than all of the joint angles of the prior configuration, determines, for each test configuration, an improvement value reflecting the improvement between the differences of the prior configuration and the test configuration with respect to the goal configuration, and selects a test configuration as the updated configuration based on the improvement values.

20 Claims, 6 Drawing Sheets

Derivation of EQ 14

Let:

goal position g               =   ($g_x$, $g_y$, $g_z$);

end effector position $e_r$ =   ($e_{rx}$, $e_{ry}$, $e_{rz}$); and
    (in root coordinate space)

end effector position $e_e$ =   ($e_{ex}$, $e_{ey}$, $e_{ez}$)
    (in end effector coordinate space)

For a rotation about the z-axis (see EQ 1):

$$e_r = [e_{ex}\ e_{ey}\ e_{ez}\ 1] \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} = \begin{bmatrix} e_{ex}\cos\theta + e_{ey}\sin\theta \\ -e_{ex}\sin\theta + e_{ey}\cos\theta \\ e_{ez} \\ 1 \end{bmatrix}^T$$

Thus, if end effector e is the only end effector of graphic structure, with reference to EQ 13:

$$\begin{aligned} F(e) &= (e_{ex}\cos\theta + e_{ey}\sin\theta - g_x)^2 + (-e_{ex}\sin\theta + e_{ey}\cos\theta - g_y)^2 + (e_{ez} - g_z)^2 \\ &= e_{ex}^2(\sin^2\theta + \cos^2\theta) + e_{ey}^2(\sin^2\theta + \cos^2\theta) \\ &\quad + 2e_{ex}e_{ey}\sin\theta\cos\theta - 2e_{ex}e_{ey}\sin\theta\cos\theta \\ &\quad + \langle\textit{other first-order sine/cosine terms}\rangle + k \\ &= e_{ex}^2 + e_{ey}^2 + \langle\textit{other first-order sine/cosine terms}\rangle + k \end{aligned}$$

Argument:

1. Because F can be expressed as a function of θ without higher order sine or cosine terms, F can be expressed in the form of EQ 14:

$$F(\theta) = A\sin(\theta + \omega) + k$$

2. Adding additional constant rotations and translations will produce an error function equivalent to moving g through the inverse transform. Because F is a sine wave for all g, rotations represented by additional transform matrices $T_i$ do not alter the result of step 1, above.

FIG. 5

Derivation of EQ 15

Let:

$$F(\theta) = A \sin(\theta + \omega) + k$$

Then:

$$F'(\theta) = A \cos(\theta + \omega)$$
$$F''(\theta) = -A \sin(\theta + \omega)$$

F has a minimum at $\theta_{min}$ if $F'(\theta_{min}) = 0$. Thus, letting:
$$\theta_{min} = \theta + \Delta\theta$$

$$\begin{aligned}
F'(\theta_{min}) &= F'(\theta + \Delta\theta) \\
&= A \cos(\theta + \Delta\theta + \omega) \\
&= A \cos((\theta + \omega) + \Delta\theta)
\end{aligned}$$

But recognizing that $F'(\theta_{min}) = 0$, and using identity:
$$\cos(a+b) = \cos a \cos b - \sin a \sin b$$

$$F'(\theta_{min}) = A[(\cos(\theta+\omega)\cos\Delta\theta - \sin(\theta+\omega)\sin\Delta\theta)] = 0$$

$$A \cos(\theta+\omega)\cos\Delta\theta = A \sin(\theta+\omega)\sin\Delta\theta$$
$$\frac{\sin \Delta\theta}{\cos \Delta\theta} = \frac{A \cos(\theta+\omega)}{A \sin(\theta+\omega)}$$
$$\tan \Delta\theta = \frac{F'(\theta)}{-F''(\theta)}$$
$$\Delta\theta = -Arctan2(F'(\theta), F''(\theta))$$
$$\theta_{min} - \theta = -Arctan2(F'(\theta), F''(\theta))$$
$$\theta_{min} = \theta - Arctan2(F'(\theta), F''(\theta))$$

FIG. 6

Derivation of EQ 16

Let:

$$\Delta F = F(\theta) - F(\theta_{min})$$

Then:

$$\begin{aligned}
\Delta F &= (A \sin(\theta+\omega) + k) - (A \sin((\theta+\omega) - \text{Arctan2}(F'\theta, F''\theta)) + k) \\
&= A \sin(\theta+\omega) - A \sin(\theta+\omega)\cos(\text{Arctan2}(F'\theta, F''\theta)) \\
&\quad + A \cos(\theta+\omega)\sin(\text{Arctan2}(F'\theta, F''\theta)) \\
&= -F''(\theta) + F''(\theta)\left(\frac{F''(\theta)}{\sqrt{F'(\theta)^2 + F''(\theta)^2}}\right) + F'(\theta)\left(\frac{F'(\theta)}{\sqrt{F'(\theta)^2 + F''(\theta)^2}}\right) \\
&= \frac{F'(\theta)^2 + F''(\theta)^2}{\sqrt{F'(\theta)^2 + F''(\theta)^2}} - F''(\theta) \\
&= \sqrt{F'(\theta)^2 + F''(\theta)^2} - F''(\theta)
\end{aligned}$$

FIG. 7

MANIPULATION OF GRAPHIC STRUCTURES USING INVERSE KINEMATICS

BACKGROUND

This invention relates to manipulation of graphic structures.

FIG. 1 illustrates an example of a graphic structure 100. Kinematics is an approach to manipulating a graphic structure by construing the structure (or a portion of the structure) as having a recursive branching arrangement, beginning with a root joint 110 branching off to zero or more joints 120, 130, and 140, each of which may, in turn, branch off to zero or more joints 121 and 141 and so on until each branch eventually terminates in an end effector 122, 130, and 142.

Graphic structures are used in fields such as computer animation. For example, FIG. 2 illustrates how the graphic structure 100 of FIG. 1 may be used to represent the upper body of a human, with root joint 210 and joint 230 representing the torso, joints 220, 221, 240, and 241 representing the shoulders and elbows, and end effectors 222 and 242 representing the wrists.

Forward kinematics addresses the problem: "Assuming a stationary root joint and given specific joint angles at the structure's joints, find the position of the end effectors." With reference to the "arms" of FIG. 2, the problem would be to find the positions of the wrists 222 and 242, given the position of the root 210 and the angles at the shoulders 220 and 240, and elbows 221 and 231. Only one configuration of the structure satisfies these conditions, and is readily determined by starting at the root joint 210 and positioning the joints 220, 221, 240, and 241, based on the given joint angles until the positions of the end effectors 222 and 242 are determined.

Inverse kinematics addresses the reverse problem: "Assuming a stationary root joint and given specific goal positions for the structure's end effectors, find a configuration of the structure that positions the end effectors at the goal positions." Again using the arms of FIG. 2, the problem involves finding angles at the shoulders 220 and 240, and elbows 221 and 241, to place the wrists 222 and 242 at specified goal positions. Unlike forward kinematics, inverse kinematics addresses a problem that may have multiple solutions, as multiple sets of joint angles may satisfy the placement requirement of the end effectors.

SUMMARY

In general, in one aspect, the invention features a computer-implemented method of manipulating a graphic structure having joint angles from an initial configuration towards a goal configuration by a succession of iterations, each of which derives an update configuration from a prior configuration.

A regular iteration determines at least one test configuration by modifying fewer than all of the joint angles of the prior configuration, determines, for each test configuration, an improvement value reflecting the improvement between the differences of the prior configuration and the test configuration with respect to the goal configuration, and selects a test configuration as the updated configuration based on the improvement values.

Certain implementations of the invention may include one or more of the following features.

Each test configuration modifies a single joint angle of the prior configuration.

The method further assigns the updated configuration as the goal configuration if the updated configuration satisfies termination criterion. For example, termination criterion may be met if the difference between the updated configuration and the goal configuration is less than a predetermined threshold.

The method further evaluates convergence of the graphic structure towards the goal configuration based on successive iterations, and if the convergence evaluation meets alternate method criteria, uses an alternate iteration method which determines test configurations by modifying up to all of the joint angles of the prior configuration. A possible alternate iteration method identifies a pattern of joint angles that have been updated in successive iterations and determines the updated configuration from the prior configuration by modifying each of the joint angles in the identified pattern. The alternate iteration method further identifies the pattern of joint angles by determining increments by which each of the pattern angles was updated in the successive iterations, and determines the updated configuration by modifying each of the joint angles by an increment based on the determined increments for the pattern angles.

The determined test configurations minimize a difference between the test configuration and the goal configuration.

The graphic structure further comprises at least one end effector, and the method determines for each test configuration, a test position for each end effector and determines the improvement value for each test configuration based on the test positions of each end effector. The method may determine each test configuration by calculating, for each test configuration, a partial derivative for each end effector with respect to the modified joint angles, and determining a test configuration that minimizes a difference between the test configuration and the goal configuration based on the partial derivatives.

In general, in another aspect, the invention enables use of the computer-implemented method through a memory device storing computer-readable instructions for aiding the computer to manipulate the graphic structure.

By using both a computationally simple method and a quickly converging method, the invention provides an iterative method for manipulating a graphic structure that efficiently converges to a goal configuration.

Other features and advantages of the invention will become apparent from the following description and from the claims.

BRIEF DESCRIPTION OF THE DRAWINGS

FIGS. 5–7 illustrate derivation of a method of manipulating a graphic structure.

DETAILED DESCRIPTION

Figure 2:
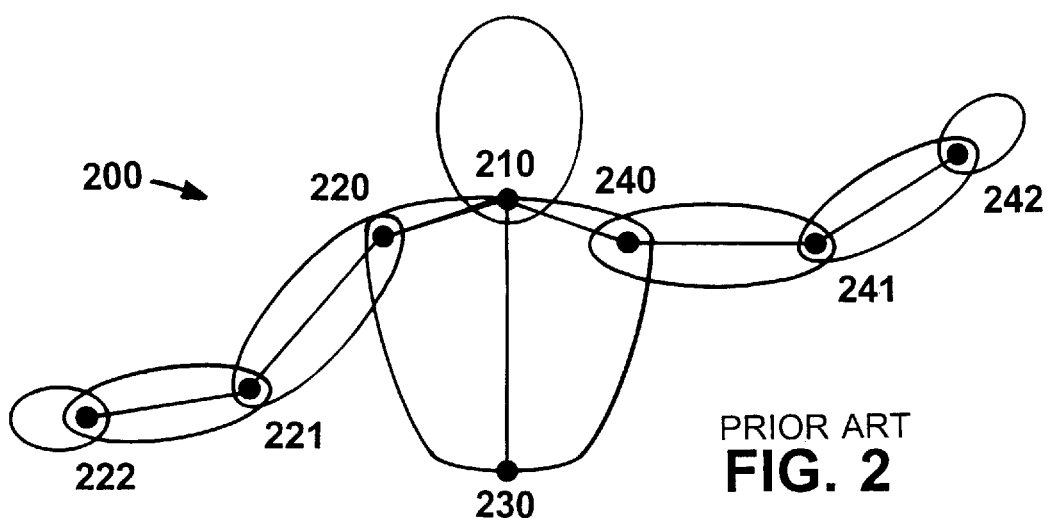

The invention addresses manipulation of a graphic structure (or a portion of a graphic structure) having at least two dimensions, such as the structure 200 illustrated in FIG. 2.

Figure 1:
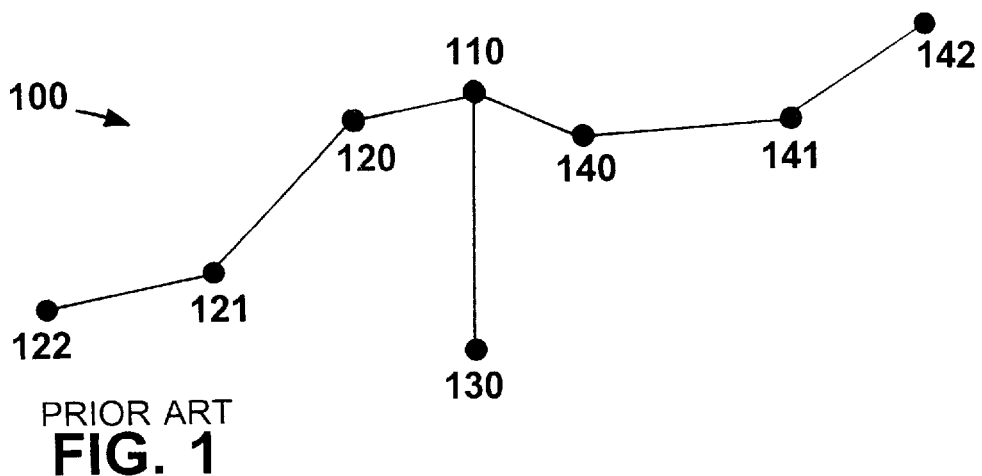
FIGS. 1 and 2 illustrate graphic structures.

Relative to a position of a root joint (e.g., joint 110 of FIG. 1), a configuration describing a specific position of a graphic structure may be described by a set of x joint angles, with each joint angle corresponding to a single degree of freedom. Thus, a joint having more than one degree of freedom will correspond to more than one joint angle. For a configuration $\theta_k$ of a structure, let:

$\theta_k$: represent the x joint angles of the structure, $\{\theta_{k,1}, \theta_{k,2}, \ldots, \theta_{k,x}\}$;

$e_k$: represent the positions of the structure's n end effectors $\{e_{k,1}, e_{k,2}, \ldots, e_{k,n}\}$, typically represented in coordinate locations;

g: represent a set of n goal positions corresponding to the n end effectors $\{g_1, g_2, \ldots, g_n\}$, where each element of g is typically represented by coordinate locations; and $F(e_k)$: represent an error function indicating how close end effectors $e_k$ are to goal positions g. The precise function may vary. As used below, $F(e_k)$ is the sum of the squared distances between each end effector $e_{k,i}$ and its corresponding goal position $g_i$. Accordingly, F is always positive and decreases as the total distance between the end effectors and the goal positions decrease. $F(e_k)=0$ indicates that $e_k=g$.

The invention manipulates a graphic structure from an initial configuration $\theta_0$ towards a goal configuration $\theta_g$, which positions the end effectors at or near the desired goal positions. One embodiment determines the goal configuration $\theta_g$ using a numerical iteration technique that in a regular iteration method, updates an approximation $\theta_{k-1}$ to a next approximation $\theta_k$ by adjusting a single joint angle to reduce the value of $F(e_{k-1})$.

Figure 3:
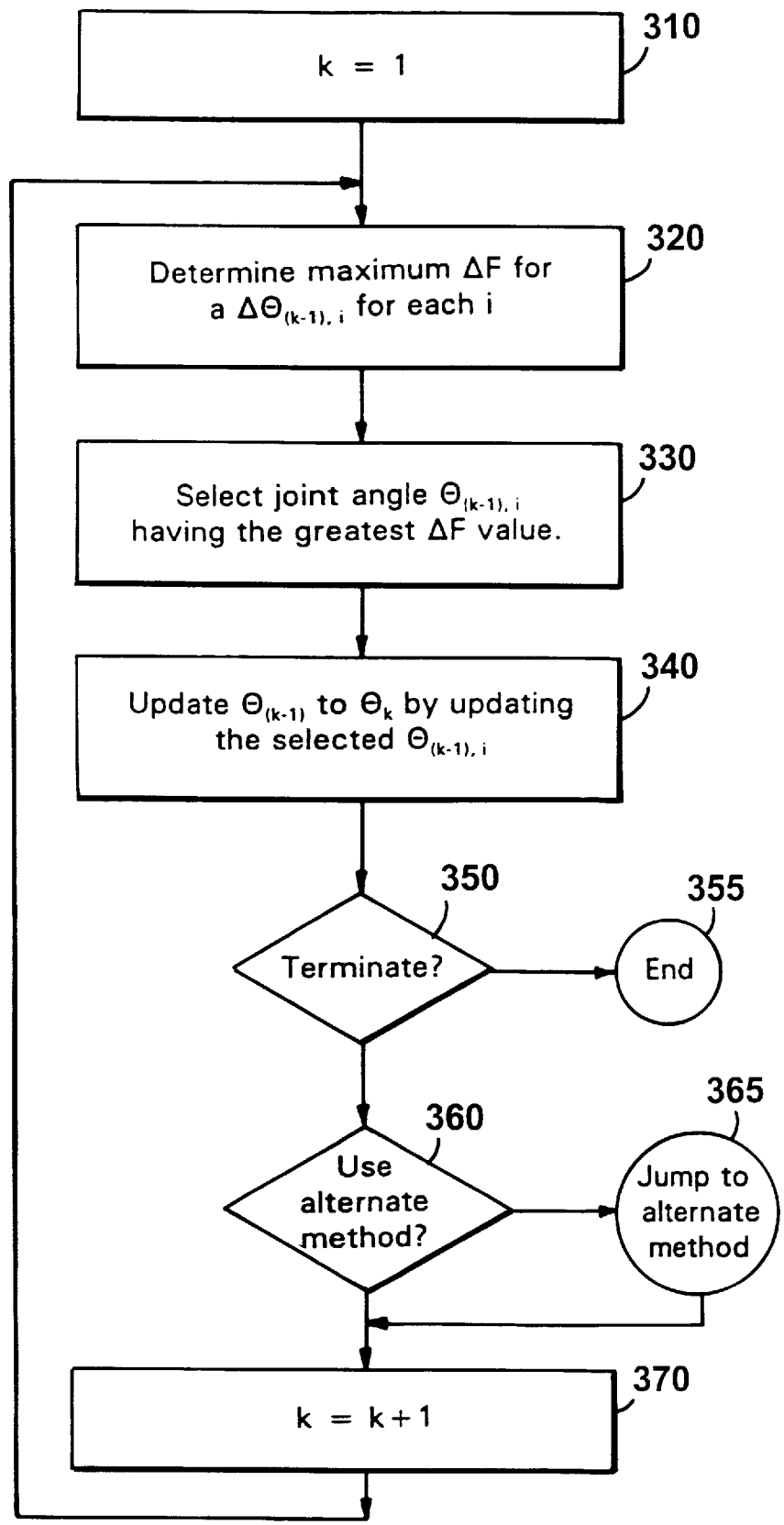
FIG. 3 is a flow diagram of a method of manipulating a graphic structure.

The flow diagram of FIG. 3 illustrates how one embodiment manipulates a graphic structure to a goal configuration. The variable k represents a counter for the number of single-angle update iterations and is initially set to 1 (310). Initial approximation $\theta_0$ is predetermined, and $\theta_k$ represents a configuration determined in the kth iteration.

320, 330, and 340 describe a single angle update method that modifies only one joint angle between sequential iterations.

To determine which angle to modify in updating a configuration $\theta_{(k-1)}$ to a configuration $\theta_k$, the embodiment determines a $\Delta F$ for each of the x joint angles, the maximum decrease in $F(e_{(k-1)})$ that can be effected by a change in joint angle $\theta_{(k-1),i}$ (320).

Figure 4:
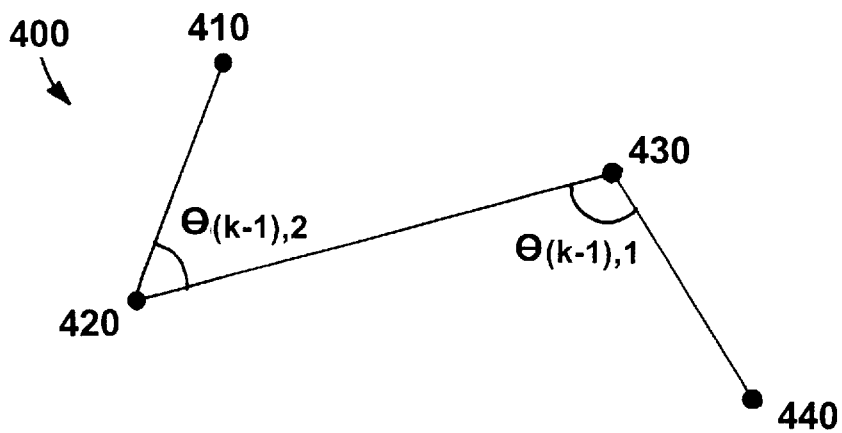
FIG. 4 illustrates a graphic structure.

For example, for the graphic structure 400 of FIG. 4, $\theta_{(k-1),1}$ and $\theta_{(k-1),2}$ are separately evaluated to determine the minimum distance (reflected by a minimum value of F) between end effector 440 and goal position 450 that can be achieved by changing a single joint angle.

The position of a joint relative to a root position may be expressed using a notation method using transform matrices, which is discussed in references such as JAMES D. FOLEY ET AL., COMPUTER GRAPHICS: PRINCIPLES AND PRACTICE 213–226 (2d ed. 1990), incorporated by reference.

Transform matrix notation uses a coordinate frame for each joint, and each transform matrix describes a relation between joints. One embodiment uses a transform matrix $T_i$ to describe the rotation between joints in a single degree of freedom, corresponding to a joint angle $\theta_i$ of a graphic structure. To represent a rotation about the z axis, $T_i$ has the following format:

$$T_i = \begin{bmatrix} \cos\theta_i & -\sin\theta_i & 0 & 0 \\ \sin\theta_i & \cos\theta_i & 0 & 0 \\ 0 & 0 & 1 & 0 \\ 0 & 0 & 0 & 1 \end{bmatrix} \quad [\text{EQ 1}]$$

Transform matrices for rotations about the x and y axes are similar, as discussed in the above reference. The axis of rotation for a specific joint angle is an attribute of the joint and is readily determined. Thus, while the following discussion uses the example of rotation about the z axis, the embodiment described handles rotation about the x and y axes as well.

Using matrix notation for graphic structure 400 having two joint angles $\theta_{(k-1),1}$ and $\theta_{(k-1),2}$, the position of end effector 440 relative to the root 410 is represented by formula:

$$e_r = e_e T_1 S_1 T_2 S_2 \quad [\text{EQ 2}]$$

where $e_r$ and $e_e$ are coordinates in three dimensional space, expressed in homogenous notation. $e_r$ is expressed in the coordinate frame of the root ($[e_{rx}, e_{ry}, e_{rz}, 1]$), and $e_e$ is expressed in its own coordinate frame ($[e_{ex}, e_{ey}, e_{ez}, 1]$). Transform matrices $T_i$ have the general format of EQ 1.

In addition to the rotational relationship described by joint angle $\theta_i$ and transform matrix $T_i$, the spatial relationship between linked joints can also include, for example, translation and twist factors. However, the embodiment expresses each of these factors independently from the rotation reflected by joint angle $\theta_i$ in a separate matrix $S_i$.

The embodiment finds the single joint angle corresponding to the greatest potential decrease in F ($\Delta F$), indicating that adjustment of that joint angle results in an updated configuration with the greatest improvement over the prior configuration with respect to distance from the goal configuration. The embodiment finds this angle using partial derivatives of F with respect to individual joint angles, derived using the partial derivatives of the end effector positions of the graphic structure with respect to the individual joint angles.

For example, for the graphic structure 400 of FIG. 4, two partial derivatives of the position of end effector 440 are calculated: one with respect to $\theta_{(k-1),1}$ and one with respect to $\theta_{(k-1),2}$.

In general, for an end effector $e_j$ having y joint angles between itself and the root, the partial derivative e' of $e_j$ with respect to a single joint angle $\theta_i$ may be expressed as:

$$e' = \frac{\partial e_{j,r}}{\partial \theta_i} = \frac{\partial}{\partial \theta_i}(e_{j,e} T_1 S_1 T_2 S_2 T_3 S_3 \ldots T_y S_y) \quad [\text{EQ 3}]$$

Each matrix S is independent of $\theta_i$, and as each joint angle $\theta_i$ corresponds to a transform matrix $T_i$, each of the transform matrices other than $T_i$ is also independent of $\theta_i$. Accordingly, EQ 3 reduces to:

$$e' = e_{j,e} T_1 S_1 \ldots T_{i-1} S_{i-1} \frac{\partial T_i}{\partial \theta_i} S_i T_{i+1} T_{i+1} \ldots T_y S_y \quad [\text{EQ 4}]$$

EQ 4 illustrates that the partial derivative of an end effector position with respect to a single joint angle $\theta_i$ is calculated by replacing the corresponding transform matrix $T_i$ with its partial derivative with respect to $\theta_i$.

The partial derivative of a rotation matrix $T_i$ about the z axis, as shown in EQ 1, is:

$$T_i' = \frac{\partial T_i}{\partial \theta_i} = \begin{bmatrix} -\sin\theta_i & -\cos\theta_i & 0 & 0 \\ \cos\theta_i & -\sin\theta_i & 0 & 0 \\ 0 & 0 & 0 & 0 \\ 0 & 0 & 0 & 0 \end{bmatrix} \quad [\text{EQ 5}]$$

Comparing EQ 1 to EQ 5 illustrates that the partial derivative $T_i'$ is:

$$T'_i = T_i \begin{bmatrix} 0 & -1 & 0 & 0 \\ 1 & 0 & 0 & 0 \\ 0 & 0 & 0 & 0 \\ 0 & 0 & 0 & 0 \end{bmatrix} \quad [EQ\ 6]$$

Thus, letting $$X' = \begin{bmatrix} 0 & -1 & 0 & 0 \\ 1 & 0 & 0 & 0 \\ 0 & 0 & 0 & 0 \\ 0 & 0 & 0 & 0 \end{bmatrix} \quad [EQ\ 7]$$

we see that in general, for a matrix having the form $[c_1\ c_2\ c_3\ c_4]$, where each $c_i$ is a column of one or more entries:

$$[c_1\ c_2\ c_3\ c_4]X' = [c_2\ -c_1\ 0\ 0] \quad [EQ\ 8]$$

EQS 7 and 8 illustrate that $T'_i$, the partial derivative of a transform matrix $T_i$, is determined without any calculation by switching and/or negating columns. More specifically, the first column of $T'_i$ is the second column of $T_i$; the second column of $T'_i$ is the negated first column of $T_i$; and the third and fourth columns of $T'_i$ are zeroes. Thus, $T'_i$ is readily determined, and calculation of EQ 4 is straight forward.

The embodiment calculates EQ 4 for each $\theta_i$ of each end effector of a graphic structure. Methods of determining the set of partial derivatives may vary. One embodiment calculates a partial derivative of an end effector position $e_r$ with respect to joint angle $\theta_i$ by letting:

(1) $p_i$ represent $e_e\ T_1 S_1 \ldots T_i$, a first partial calculation of EQ 4;

(2) $q_i$ represent $e_e\ T_1 S_1 \ldots T'_i$, a modification of $p_i$; and (3) $R_i$ represent $S_1\ T_{(i+1)}S_{(i+1)} \ldots T_y\ S_y$, a remaining portion of the matrix string of EQ 4.

Letting $PD_i$ represent a partial derivative of an end effector with respect to a joint angle $\theta_i$, the embodiment calculates $PD_i$ for each of the joint angles by the following steps:

1. Initially, $i=1$, $p_0=q_0=e_e$, $R_y=S_y$.
2. Calculate $p_i=p_{i-1}*T_i$.
3. Calculate $q_i=p_{i-1}*T'_i=p_i*X'$. This step may be calculated without computation by switching and negating columns, as discussed above.
4. If $i=y$ go to step 5. Otherwise, increment i and return to step 2.
5. Calculate $PD_i=q_i*R_i$.
6. If $i=1$, go to step 8. Otherwise, decrement i.
7. Calculate $R_i=S_i*T_{i+1}*R_{i+1}$, and return to step 5.
8. End.

Thus, for the example of graphic structure 400 of FIG. 4, partial derivatives are calculated as follows:

$p_0=q_0=e_e$; $R_2=S_2$
$p_1=p_0*T_1$
$q_1=p_1*X'$
$p_2=p_1*T_2$
$q_2=p_2*X'$
$PD_2=q_2*R_2$
$R_1=S_1*T_2*R_2$
$PD_1=q_1*R_1$

The second order derivatives are calculated in the same manner, except that matrix $T'_i$ is replaced by matrix $T''_i$:

$$T''_i = \frac{\partial^2 T_i}{\partial^2 \theta_i} = \begin{bmatrix} -\cos\theta_i & \sin\theta_i & 0 & 0 \\ -\sin\theta_i & -\cos\theta_i & 0 & 0 \\ 0 & 0 & 0 & 0 \\ 0 & 0 & 0 & 0 \end{bmatrix} \quad [EQ\ 9]$$

Comparing EQS 1, 5, and 9 illustrates that the partial derivative $T''_i$ is:

$$T''_i = T_i \begin{bmatrix} -1 & 0 & 0 & 0 \\ 0 & -1 & 0 & 0 \\ 0 & 0 & 0 & 0 \\ 0 & 0 & 0 & 0 \end{bmatrix} \quad [EQ\ 10]$$

Thus, letting:

$$X'' = \begin{bmatrix} -1 & 0 & 0 & 0 \\ 0 & -1 & 0 & 0 \\ 0 & 0 & 0 & 0 \\ 0 & 0 & 0 & 0 \end{bmatrix} \quad [EQ\ 11]$$

we see that in general, for a matrix having the form $[c_1\ c_2\ c_3\ c_4]$, where each $c_i$ is a column of one or more entries:

$$[c_1\ c_2\ c_3\ c_4]X'' = [-c_1\ -c_2\ 0\ 0] \quad [EQ\ 12]$$

EQS 11 and 12 show that $T''_i$, like $T'_i$, is determined without any calculation. The second partial derivative has a first column that is the negated first column of $T_i$ and the second column that is the negated second column of $T_i$. The third and fourth columns of $T''_i$ are zeroes.

This process thus produces first and second order derivatives of an end effector position with respect to a change in a single joint angle. Using three dimensional coordinate components (x, y, z), a first order partial derivative of an end effector with respect to a joint angle $\theta_i$ in a configuration $\theta_k$ has coordinates ($e'_x$, $e'_y$, $e'_z$) and a second order partial derivative with respect to joint angle $\theta_i$ has coordinates ($e''_x$, $e''_y$, $e''_z$).

One embodiment uses the sum of the squares of the distances between the end effectors and their corresponding goal positions for error function F. Using goal positions g, and the first and second order derivatives calculated for each joint angle $\theta_i$, the values of F, F', and F" are calculated as follows:

$$F(e) = \Sigma\ (e_x - g_x)^2 + (e_y - g_y)^2 + (e_z - g_z)^2 \quad [EQ\ 13]$$

$$F'(e) = \frac{\partial F(e)}{\partial \theta_i} = \Sigma 2(e_x - g_x)e'_x + 2(e_y - g_y)e'_y + 2(e_z - g_z)e'_z$$

$$F''(e) = \frac{\partial^2 F(e)}{\partial^2 \theta_i} = \Sigma 2e^2 + 2(e_x - g_x)e''_x + 2e^2 +$$

$$2(e_y - g_y)e''_y + 2e^2 + 2(e_z - g_z)e''_z$$

The partial derivatives F' and F" are used in minimizing error function F. Different minimization techniques may be used, and general background about iterative minimization may be found in references such as WILLIAM H. PRESS, NUMERICAL RECIPES IN C: THE ART OF SCIENTIFIC COMPUTING Ch. 10(1995), incorporated by reference.

One embodiment minimizes error function F by recognizing that if F is the sum of the squares of the distances between end effectors and goal positions and is a function of a single joint angle $\theta_i$, F can always be written in the following form:

$$F(\theta_i) = A\sin(\theta_i + \omega) + k \quad [EQ\ 14]$$

where A is an amplitude, $\theta_i$ is a joint angles, $\omega$ represents the effect of other joint angles, and k represents an offset. The derivation of EQ 14 is shown in FIG. 5.

Thus, because F has no higher order sine terms, it can be expressed as a sine function in the form of EQ 14.

The value for $\theta_i$ resulting in the smallest value of F, derived from EQ 14:

$$\theta_{mini} = \theta_i - \text{Arctan2}(F', F'') \qquad [EQ\ 15]$$

from which the resulting difference in F is derived:

$$\Delta F_{\theta_i} = \sqrt{(F'^2_{\theta_i} + F''^2_{\theta_i})} - F''_{\theta_i} \qquad [EQ\ 16]$$

Derivation of EQ 15 and EQ 16 are further shown in FIGS. 6 and 7, respectively.

After each of the joint angles $\theta_{(k-1),i}$ and its corresponding $\Delta F_{\theta_i}$ value are evaluated, the joint angle $\theta_{(k-1)i}$ having the greatest $\Delta F_{\theta_i}$ value is selected (330) and configuration $\theta_{(k-1)}$ is updated to configuration $\theta_k$ by replacing $\theta_{(k-1)i}$ with $\theta_{min\ i}$ (340).

Updated configuration $\theta_k$ is evaluated to determine whether it meets a termination condition (350), in which case the iterative process ends (355). For example, a possible termination condition is if end effectors $\theta_k$ come within a threshold distance from goal positions g—one embodiment recognizes such a condition by a value for $F(e_k)$ falling below a predetermined threshold. Should this occur, $\theta_k$ is assigned as the goal configuration $\theta_g$, completing the iterative process (355).

Termination (355) may also occur if the iterative process has exceeded a predetermined limit without finding goal configuration $\theta_g$ (e.g., the process has exceeded a predetermined number of iterations or a predetermined processing time limit).

Even if termination conditions are not met, the regular iterative method described by 320, 330, and 340 may be interrupted in some situations. The practical success of an iterative technique depends in part on reducing the number of iterations required to find $\theta_g$, which in turn depends on the update method: the faster the update method converges towards the goal configuration, the fewer iterations will be required. Thus, if termination conditions are not met, a possibility is to switch to an alternate update method (360, 365).

Generally, the embodiment switches to an alternate update method when prior iterations are determined to converge towards the goal configuration too slowly. Specific criteria may vary. For example, a cyclic pattern of the specific joint angles updated may indicate slow convergence; accordingly, one embodiment switches to an alternate update method (365) when a pattern is recognized. Another embodiment switches to an alternate update method (365) when the number of iterations exceeds a predetermined threshold. Another embodiment keeps a record of updates in sequential iterations, and if a pattern of minimal progress is detected (indicated, for example by a series of low values for $\Delta F$), an alternate method (365) is used.

A variety of alternate update methods (365) may be used. For example, the update method represented by 320, 330, and 340 modifies a single joint angle in an iteration. In some cases, convergence towards goal configuration $\theta_g$ is faster if more than one joint angle is modified in an iteration.

One embodiment uses an update method based on a variation of Powell's conjugate direction set method to update configuration $\theta_{(k-1)}$ by altering multiple joint angles in one iteration. Powell's method is explained in references such as WILLIAM H. PRESS, NUMERICAL RECIPES IN C: THE ART OF SCIENTIFIC COMPUTING, at 412–420.

One embodiment performs the following steps for updating a graphic structure $\theta$:

1. Perform the normal single angle update method until a pattern in update angles is recognized. For example, if the pattern angles in consecutive iterations are . . . $\theta_1, \theta_3, \theta_4, \theta_1, \theta_3, \theta_4, \ldots$ a pattern of $\theta_1, \theta_3, \theta_4$, may be recognized.

A cyclic pattern of updated angles tends to update a pattern angle in similar increments in sequential cycles, and generally indicates that F can be minimized by updating the graphic structure by moving, in a single update, each of the pattern angles.

2. Determine the set of p independent joint angles of graphic structure $\theta$ to be moved, based on the joint angles of the pattern identified in step 1. (This step differs from the traditional Powell's method, which would evaluate and modify every joint angle to minimize F.)

3. Move the graphic structure from a configuration $\theta_{k-1}$ to an updated configuration $\theta_k$ by modifying each of the p pattern angles. In general, the increments by which each angle is modified will generally be based on the pattern increments recognized for that angle.

For example, one embodiment uses the increments recognized in the last cycle. Using the above pattern, and using $\Delta\theta_1, \Delta\theta_3, \Delta\theta_4$, to indicate the increments recognized in the last cycle, the modifications $\Delta_a\theta_1, \Delta_a\theta_3, \Delta_a\theta_4$ for the alternate update are:

$\Delta_a\theta_1 = \theta_1 + t\ \Delta\theta_1$;

$\Delta_a\theta_3 = \theta_3 + t\ \Delta\theta_3$; and $\Delta_a\theta_4 = \theta_4 + t\ \Delta\theta_4$.

The alternate update method finds a value for t that minimizes F. In this implementation, t is found using the golden ratio search with parabolic interpolation, explained in references such as previously referenced WILLIAM H. PRESS, NUMERICAL RECIPES IN C: THE ART OF SCIENTIFIC COMPUTING, at 394–408. Other methods for finding t also exist.

Just as the conditions under which an alternate update method is used may vary, the conditions under which the iterative single angle update method of 320, 330, and 340 is resumed may also vary. One embodiment switches back to the single angle modification method after one iteration of the alternate update method.

If the process has not terminated (350, 355) and an alternate update method is not used (360, 365), iteration counter k is incremented (370), and the process repeats.

While the invention is described in terms of a software implementation, the invention may be implemented in hardware or software, or a combination of both. Preferably, the invention is implemented in a software program executing on a programmable processing system comprising a processor, a data storage system, an input device, and an output device.

Figure 8:
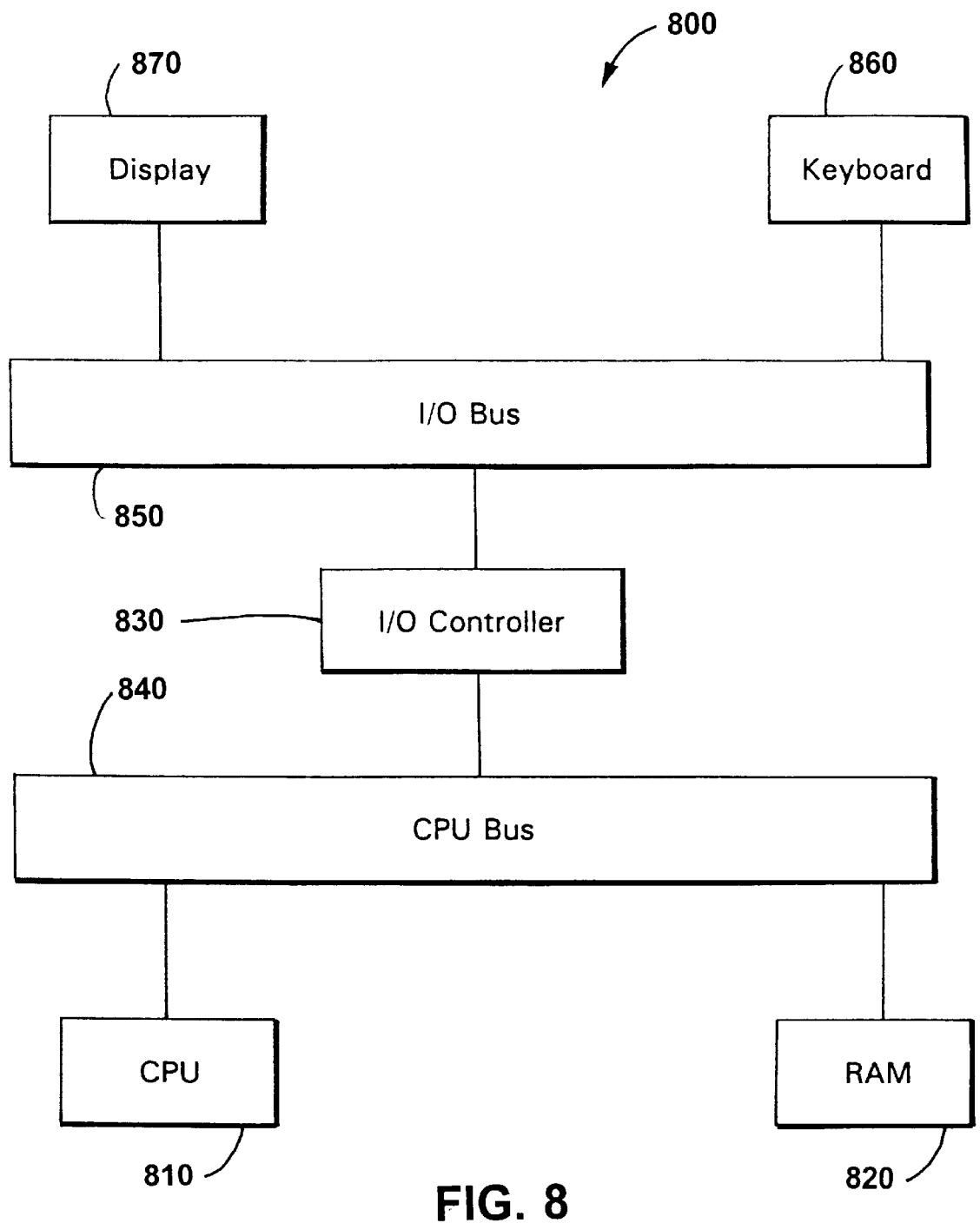
FIG. 8 illustrates a programmable processing system.

FIG. 8 illustrates one such programmable processing system 800, including a CPU 810, a RAM 820, and an I/O controller 830 coupled by a CPU bus 840. The I/O controller 830 is also coupled by an I/O bus 850 to input devices such as a keyboard 860, and output devices such as a display 870.

Other embodiments are within the scope of the following claims.

For example, while an embodiment was described with reference to structure 400 of FIG. 4, which has only a single end effector, the invention extends to graphic structures having multiple end effectors.

Other variations are possible. For example, as previously indicated, a variety of criteria may be used to determine when to stop the iterative process. Similarly, other alternate update methods may be used, and the conditions for returning to the single angle update method may vary.

What is claimed is:

1. A computer-implemented method of manipulating a graphic structure having joint angles from an initial configuration towards a goal configuration by a succession of iterations, in each of which an update configuration is derived from a prior configuration, the method comprising in a regular iteration:

determining at least one test configuration by modifying fewer than all of the joint angles of the prior configuration;

determining, for each test configuration, an improvement value reflecting the improvement between the differences of the prior configuration and the test configuration with respect to the goal configuration; and selecting a test configuration as the updated configuration based on the improvement values.

2. The method of claim 1, wherein determining each test configuration modifies a single joint angle of the prior configuration.

3. The method of claim 1 further comprising assigning the updated configuration as the goal configuration if the updated configuration satisfies termination criterion.

4. The method of claim 3, further comprising determining an error value between the updated configuration and the goal configuration, wherein the termination criterion is met if the error value of the updated configuration indicates that the difference is less than a predetermined threshold.

5. The method of claim 1 further comprising:

evaluating convergence of the graphic structure towards the goal configuration based on successive iterations; and if the convergence evaluation meets alternate method criteria, using an alternate iteration method which determines test configurations by modifying up to all of the joint angles of the prior configuration.

6. The method of claim 5, wherein the alternate iteration method further comprises:

identifying a pattern of joint angles that have been updated in successive iterations; and determining the updated configuration from the prior configuration by modifying each of the joint angles in the identified pattern.

7. The method of claim 6, wherein:

identifying the pattern of joint angles further comprises determining increments by which each of the pattern angles was updated in the successive iterations; and determining the updated configuration further comprises modifying each of the joint angles by an increment based on the determined increments for the pattern angles.

8. The method of claim 1, wherein determining each test configuration determines a test configuration that minimizes a difference between the test configuration and the goal configuration.

9. The method of claim 1, wherein the graphic structure further comprises at least one end effector, the method further comprising:

determining, for each test configuration, a test position for each end effector; and determining the improvement value for each test configuration based on the test positions of each end effector.

10. The method of claim 9, wherein determining each test configuration further comprises:

calculating, for each test configuration, a partial derivative for each end effector with respect to the modified joint angles; and determining a test configuration that minimizes a difference between the test configuration and the goal configuration based on the partial derivatives.

11. A memory device storing computer-readable instructions for aiding a computer to manipulate a graphic structure having joint angles from an initial configuration towards a goal configuration by a succession of iterations, in each of which an update configuration is derived from a prior configuration, the instructions comprising for a regular iteration:

instructions for determining at least one test configuration by modifying fewer than all of the joint angles of the prior configuration;

instructions for determining, for each test configuration, an improvement value reflecting the improvement between the differences of the prior configuration and the test configuration with respect to the goal configuration; and instructions for selecting a test configuration as the updated configuration based on the improvement values.

12. The memory device of claim 11, wherein instructions for determining each test configuration modify a single joint angle of the prior configuration.

13. The memory device of claim 11, further comprising instructions for assigning the updated configuration as the goal configuration if the updated configuration satisfies termination criterion.

14. The memory device of claim 13, further comprising instructions for determining an error value between the updated configuration and the goal configuration, wherein the termination criterion is met if the error value of the updated configuration indicates that the difference is less than a predetermined threshold.

15. The memory device of claim 11 further comprising:

instructions for evaluating convergence of the graphic structure towards the goal configuration based on successive iterations; and instructions for using an alternate iteration method which determines test configurations by modifying up to all of the joint angles of the prior configuration, if the convergence evaluation meets alternate method criteria.

16. The memory device of claim 15, further comprising instructions for the alternate iteration method, including:

instructions for identifying a pattern of joint angles that have been updated in successive iterations; and instructions for determining the updated configuration from the prior configuration by modifying each of the joint angles in the identified pattern.

17. The memory device of claim 16, wherein:

instructions for identifying the pattern of joint angles further comprise instructions for determining increments by which each of the pattern angles was updated in the successive iterations; and instructions for determining the updated configuration further comprise instructions for modifying each of the joint angles by an increment based on the determined increments for the pattern angles.

18. The memory device of claim 11, wherein instructions for determining each test configuration determine a test configuration that minimizes a difference between the test configuration and the goal configuration.

19. The memory device of claim 11, wherein the graphic structure further comprises at least one end effector, the instructions further comprising:

instructions for determining, for each test configuration, a test position for each end effector; and instructions for determining the improvement value for each test configuration based on the test positions of each end effector.

20. The memory device of claim 19, wherein instructions for determining each test configuration further comprise:

instructions for calculating, for each test configuration, a partial derivative for each end effector with respect to the modified joint angles; and instructions for determining a test configuration that minimizes a difference between the test configuration and the goal configuration based on the partial derivatives.

* * * * *